(12) United States Patent
Kapitanski et al.

(10) Patent No.: US 10,379,911 B2
(45) Date of Patent: Aug. 13, 2019

(54) OPEN-ENDED POLICIES FOR VIRTUAL COMPUTING INSTANCE PROVISIONING

(71) Applicant: VMware, Inc., Palo Alto, CA (US)

(72) Inventors: Georgi Kapitanski, Sofia (BG); Stoyan Hristov, Sofia (BG); Mincho Tonev, Sofia (BG); Johnny Papadami, Sofia (BG)

(73) Assignee: VMware, Inc., Palo Alto, CA (US)

( * ) Notice: Subject to any disclaimer, the term of this patent is extended or adjusted under 35 U.S.C. 154(b) by 55 days.

(21) Appl. No.: 15/462,587

(22) Filed: Mar. 17, 2017

(65) Prior Publication Data

US 2018/0267838 A1 Sep. 20, 2018

(51) Int. Cl.
```
G06F 9/50      (2006.01)
G06F 9/455     (2018.01)
G06F 9/451     (2018.01)
```
(52) U.S. Cl.
CPC ........ *G06F 9/5077* (2013.01); *G06F 9/45558* (2013.01); *G06F 9/451* (2018.02); *G06F 2009/45579* (2013.01); *G06F 2009/45583* (2013.01); *G06F 2009/45595* (2013.01)

(58) Field of Classification Search
CPC .................................................... G06F 9/5077
See application file for complete search history.

(56) References Cited

U.S. PATENT DOCUMENTS

| | | | |
|---|---|---|---|
| 2011/0252163 A1* | 10/2011 | Villar ................. | G06F 17/5027 710/16 |
| 2018/0176255 A1* | 6/2018 | Bansal ................... | H04L 63/20 |

\* cited by examiner

*Primary Examiner* — Charlie Sun

(57) ABSTRACT

The systems described herein are configured to reduce the number of resource policies created and stored on a cluster for provisioning and/or managing virtual computing instances (VCIs) utilization of one or more resources. An open-ended VCI policy including at least one open-ended rule having an undefined value and a resource is selected. A set of valid values compatible with a selected resource corresponding to each open-ended rule is presented to the user. The user selects a valid value for each open-ended rule from the set of valid values via a user interface (UI). The selected valid values are assigned to each open-ended rule to create a complete VCI open-ended policy. The complete VCI open-ended policy is applied to provision one or more VCIs. The same open-ended VCI policy may be applied to provision different VCIs by assigning a different set of user selected valid values.

20 Claims, 10 Drawing Sheets

FIG. 6

Create New VM Storage Policy

✓ 1 Name and description
✓ 2 Policy structure
✓ 2a Common rules
    2b Rule-set 1
    3 Storage compatibility
    4 Ready to complete

Rule-set 1   602
Select a storage type to place the VM and add rules for data services provided by datastores. The rule-set will be applied when VMs are placed on datastores from the selected storage type. Adding tags to the rule-set will filter only datastores matching those tags.

☑ Use rule-sets in the storage policy ⓘ

▶ Placement

Storage Type:   VSAN ▶   ⊗    — 604

Flash read cache reservation (%) ⓘ   0   ⊗    — 606

Force provisioning ⓘ   No ▶   ⊗    — 608

Number of failures to tolerate   — 610

<Add rule> ▶    — 612

➕ Add component

Storage Consumption Model

A virtual disk with size 100 GB would consume:

200 GB

Initially reserved storage space
0 B

[ Add another ruleset ]   [ Remove this ruleset ]

[ Back ]   [ Next ]   [ Finish ]   [ Cancel ]

New Virtual Machine 704

1 Select creation type
  1a Select a creation type ✓
2 Edit settings
  2a Select a name and folder ✓
  2b Select a compute resource ✓
  2c Select storage 702
    2ca Define open parameters
  2d Select compatibility
  2e Select a guest OS
  2f Customize hardware
3 Ready to complete

Select storage
Select the datastore in which to store the configuration and disk files VM storage policy: [Policy A (open-ended) ▼] 706  ⓘ Open-ended storage policy is selected The following datastores are accessible from the destination resource that you selected. Select the destination datastore for the virtual machine configuration files and all of the virtual disks.

| Name | Capacity | Provisioned | Free | Type | Cluster |
|---|---|---|---|---|---|
| Datastore 2.2  708 | 49.75 GB | 9.95 GB | 40.8 GB | VMFS 5 | |
| Datastore 2.1  710 | 42.5 GB | 6.55 GB | 38.2 GB | VMFS 5 | |
| vsanDatastore (1)  712 | 0 B | 0 B | 0 B | vsan | |

Compatibility:
⊘ Compatibility checks succeeded.

[Back] [Next] [Finish] [Cancel]

700

OPEN-ENDED POLICIES FOR VIRTUAL COMPUTING INSTANCE PROVISIONING

BACKGROUND

Storage policies permit a user to manage storage for virtual machines (VMs). A storage policy includes rules and rule values describing requirements for storage resources. A different storage policy is created based on the capabilities of each individual data store, individual VM, group of data stores, or group of VMs. Storage policies may be grouped by their storage requirements (e.g., latency, replication, encryption, etc.). If a new data store is added to the inventory with a new set of values for a given capability, it becomes necessary to create a new storage policy to use those values.

This existing process of creating separate storage policies leads to unmanageably large numbers of storage polices in systems having hundreds or thousands of VMs. In these cases, it may become impractical, burdensome, and/or cost prohibitive to create all these different storage policies to accommodate the capabilities of all the various data stores in the inventory.

BRIEF DESCRIPTION OF THE DRAWINGS

FIG. 6 is an exemplary screenshot illustrating a user interface (UI) for creating an open-ended VCI policy.

FIG. 7 is an exemplary screenshot illustrating a UI for selecting a data store compatible with a selected open-ended VCI policy.

Corresponding reference characters indicate corresponding parts throughout the drawings.

DETAILED DESCRIPTION

Figure 1:
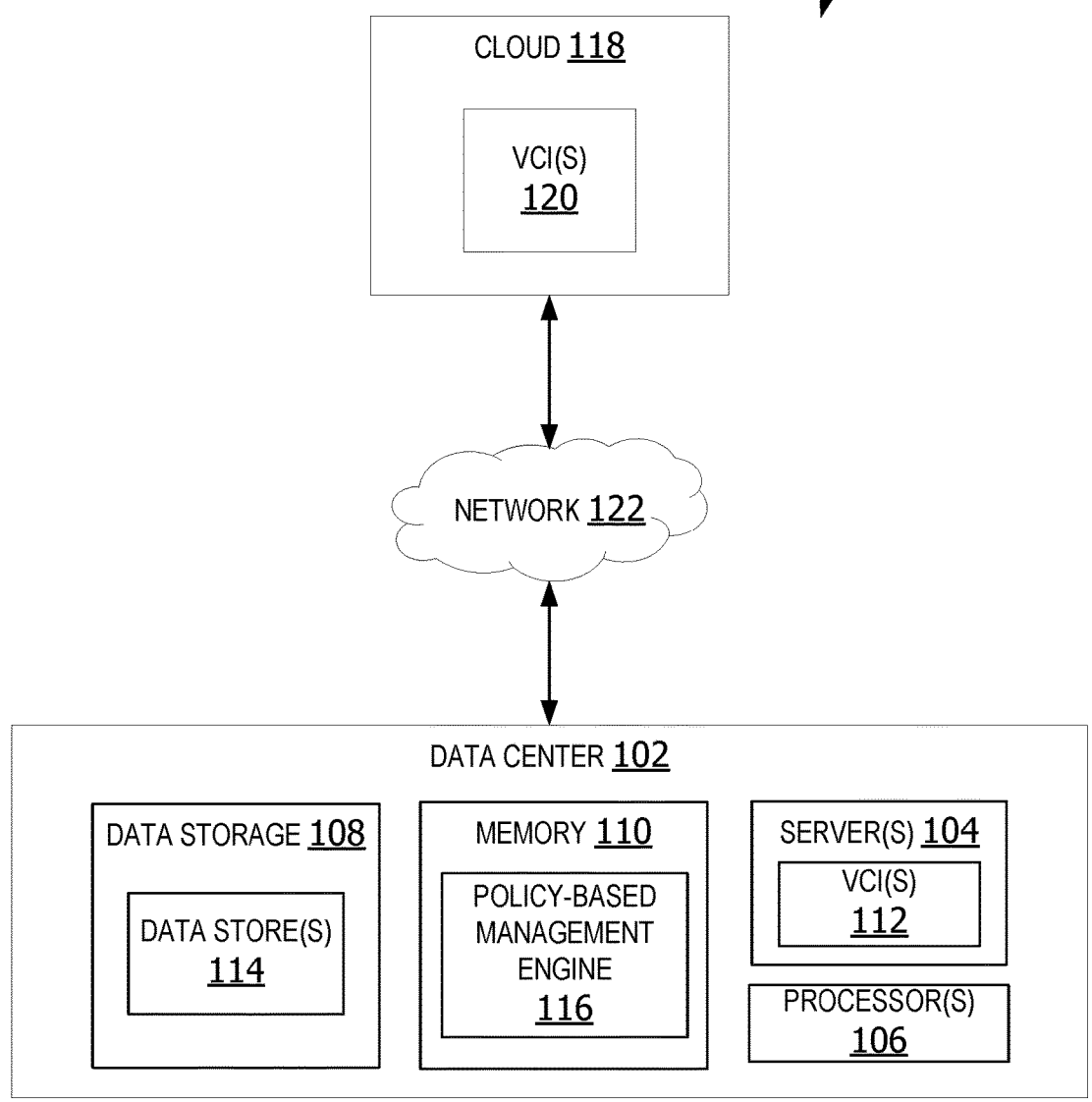
FIG. 1 is an exemplary block diagram illustrating a data storage system.

A virtual computing instance (VCI) policy provides rules defining utilization of one or more resource capabilities by a VCI governed by the policy. A resource may be data storage resources, processor resources, network resources, or other resources within a cluster. Some examples provide open-ended VCI policies for provisioning VCIs in a cluster. An open-ended VCI policy is a policy having at least one open-ended rule with an undefined value that depends on a specific VCI and/or a selected resource, such as, but not limited to, a data store. In contrast, a rule with a specified value may be referred to as a closed-ended rule.

In some examples, an administrator may apply an open-ended VCI policy and a first set of user selected values to a newly provisioned VCI. The policy and user selected values determine how the VCI utilizes one or more resources. The provisioned VCI utilizes capabilities of one or more resources in accordance with the policy rules and selected values.

An administrator in other examples may apply the same open-ended policy with a different, second set of user selected values to different, second VCI. The second VCI may utilize the same resource differently in accordance with the different user-selected values. Likewise, the same open-ended VCI policy and a different, third set of user selected values may be applied to provision a third VCI to utilize a different resource. The second VCI and third VCI may utilize different resource capabilities and/or perform different functions based on the same open-ended VCI policy.

An open-ended storage policy is an open-ended VCI policy governing provision and/or utilization of data storage resource by one or more VCIs. In some examples, an open-ended storage policy includes a set of rules or parameters to control and manage data within a cluster. The open-ended storage policy may include policies that determine how data is stored, collected, backed-up, latency, replication, encryption, and other aspects of data storage. An administrator may apply the same open-ended policy to provision multiple different VCIs using one or more data stores. The open-ended storage policies reduce the total number of policies in inventory. This keeps the number of storage policies manageable and conserves memory with the reduced quantity of storage policies.

In some examples, a policy-based management engine 116 obtains user selected values for an open-ended storage policy to provision one or more VCIs with a selected data store. This enables undefined values to be selected by a user after the VCI and data store have been selected. In this manner, a single open-ended storage policy serves to provision multiple different VCI configurations on disparate data stores. An administrator selects different values for the open-ended rules when provisioning those different VCIs.

In addition, many similar policies distinguished only by a few rules may be replaced by a single open-ended storage policy. The open-ended storage policies may also be used to pass additional VCI configuration settings, which are unique for the newly provisioned VCI, without creating a new storage policy.

In some examples, a user interface (UI) is provided for creating open-ended storage policies and applying one or more open-ended storage policies to create a VCI on a selected data store. The UI improves user efficiency when creating policies and VCIs via the UI interaction.

While some embodiments are described with reference to virtual machines (VMs) for clarity of description, the disclosure is operable with other forms of VCIs. A VCI may be a VM, a software container, and/or any other type of virtualized computing instance.

Referring to FIG. 1, an exemplary block diagram illustrates a data storage system 100 for open-ended policy-based management. The system may include one or more data centers, such as data center 102.

The data center 102 in this example is a virtualized data center including one or more server(s) 104, one or more processor(s) 106, data storage 108, and/or memory 110. In this example, the data center 102 includes one or more physical computing devices such as, but not limited to, the one or more server(s) 104 and/or physical processors. In other examples, the data center 102 hardware components support one or more virtual systems, such as a virtual network, virtual server(s), virtual storage, or other virtualized infrastructure. For example, the data center 102 may include a software defined data center (SDDC).

The server(s) 104 may include a single server, as well as two or more servers in a cluster. In some examples, the server(s) 104 include a plurality of physical servers in a rack scale architecture (RSA). In yet other examples, the server(s) 104 includes one or more blade servers. In still other examples, the sever(s) 104 are implemented as one or more servers in a VMware vSphere cluster from VMware, Inc.

The server(s) 104 host a set of one or more VCIs 112. An administrator creates and/or manages one or more VCIs 112 on the server(s) 104 using one or more open-ended storage policies. A VCI may include a VM, a container, or any other type of VCI, as further described herein. A VM typically includes an operating system (OS) running one or more applications or portions of an application to perform a workload. VMs running on a host utilize cluster resources to perform the workloads.

The data storage 108 in this non-limiting example includes one or more devices for storing data. The data storage 108 may be implemented as one or more data storage devices, including, but without limitation, a hard disk, optical disk, a redundant array of independent disks (RAID), a solid-state drive (SSD), a flash memory drive, a storage area network (SAN), or any other type of data storage device. The data storage device(s) may include rotational storage, such as a disk. The data storage device(s) may also include non-rotational storage media, such as SSD or flash memory.

In some non-limiting examples, the data storage 108 provides one or more shared data store(s) 114. The shared data store(s) 114 include data storage accessible by two or more hosts in the cluster, such as databases, file systems, files, emails, and other data repositories.

Figure 4:
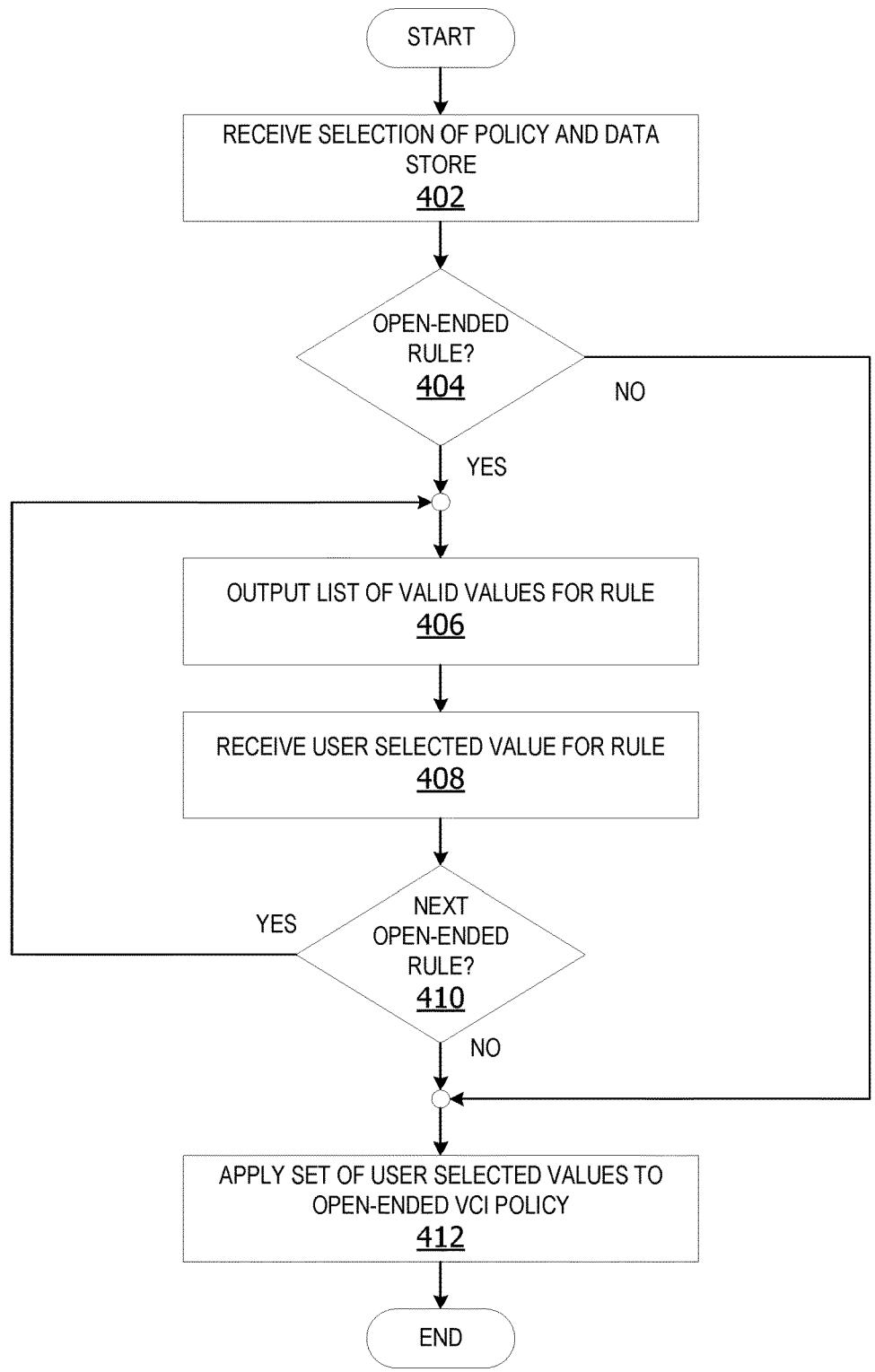
FIG. 4 is an exemplary flow chart illustrating creation of a VCI on a data store in accordance with an open-ended policy.
Figure 5:
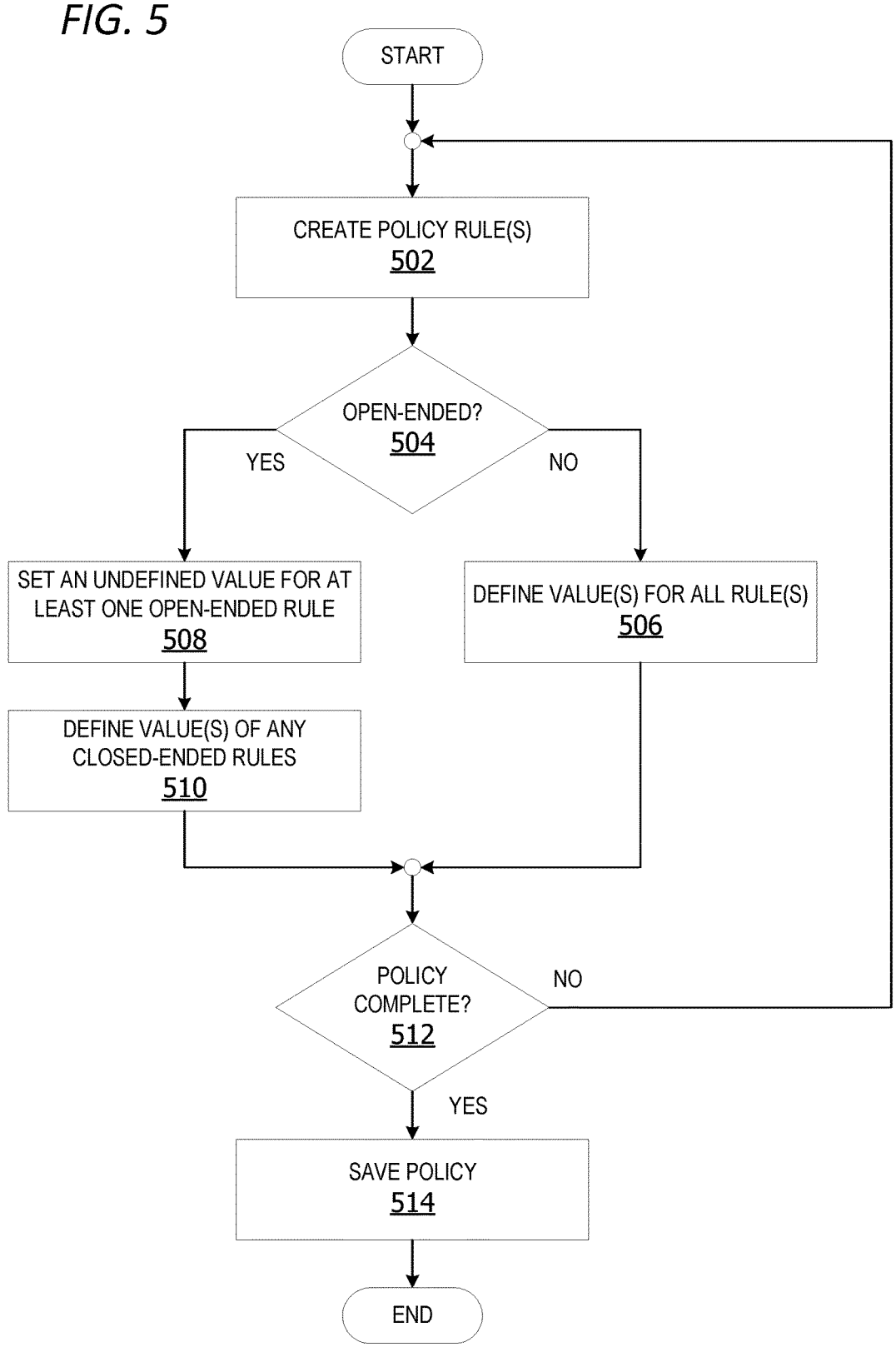
FIG. 5 is an exemplary flow chart illustrating creation of an open-ended VCI policy.

The processor(s) 106 include one or more processing units, and is programmed to execute computer-executable instructions for implementing the examples. The instructions may be performed by the processor or by multiple processors within the one or more server(s) 104, or performed by a processor external to the one or more server(s) 104. In some examples, the one or more processors are programmed to execute instructions such as those illustrated in the figures (e.g., FIG. 4 and FIG. 5, shown below).

The processor(s) 106 may be implemented as one or more central processing units (CPUs) and/or one or more graphical processing units (GPUs). In some examples, the processor(s) 106 execute the policy-based management engine 116 to create and/or manage VCI(s). In still other examples, the policy-based management engine 116 is executed by one or more GPUs.

The network 122, in some examples, is a Wide Area Network (WAN) accessible to the public, such as the Internet. The network 122 is implemented by one or more physical network components, such as, but without limitation, routers, switches, network interface cards (NICs), and other network devices. The network 122 in some examples includes a virtual network (not shown). The virtual network may include virtual switches, virtual routers, virtual NICs, and other virtualized network infrastructure.

In some example, one or more hosts associated with a cloud platform supports one or more VCIs 120, such as cloud 118. The cloud 118 may be implemented as a public cloud, a private cloud, or a hybrid cloud. The cloud services may be provided via one or more physical servers, such as server(s) 104 in the data center 102.

The memory 110 includes any quantity of media associated with or accessible by the one or more server(s) 104. The memory 110 may be internal to the one or more server(s) 104, external to the one or more server(s) 104, or both. In some examples, the memory 110 includes read-only memory (ROM) (not shown).

The memory 110 in some examples, further includes a random-access memory (RAM). The RAM may be part of a shared memory architecture. In some examples, the RAM may optionally include one or more cache(s).

The memory 110 in this example includes the policy-based management engine 116. The policy-based management engine 116 manages one or more open-ended policies. An open-ended storage policy is a set of rules associated with a resource. The open-ended storage policy includes at least open-ended rule. An open-ended rule includes an unspecified value. An unspecified value is undefined. A closed-ended rule includes a defined or specified value.

The policy-based management engine 116 in some examples receives a selection of an open-ended storage policy. The policy-based management engine 116 identifies one or more data stores compatible with the selected open-ended storage policy. The policy-based management engine 116 receives a selection of a data store from the list of identified data stores compatible with the open-ended storage policy. A data store is compatible if it supports capabilities defined by the open-ended storage policy. The policy-based management engine 116 then outputs a set of valid values for each open-ended rule.

The policy-based management engine 116 in some examples receives a user selected value for each open-ended rule chosen from the set of valid values. The policy-based management engine 116 applies the user selected values to the selected open-ended VCI policy to generate a complete open-ended storage policy. A complete open-ended VCI policy is an open-ended policy having a user selected value assigned to every open-ended rule. The complete open-ended VCI policy is applied to provision one or more VCIs using the selected resource. In other words, one or more VCIs utilize or interface with the selected resource to utilize capabilities of the resource in accordance with the policy rules and user-selected values. A resource may include, without limitation, a data store.

Figure 2:
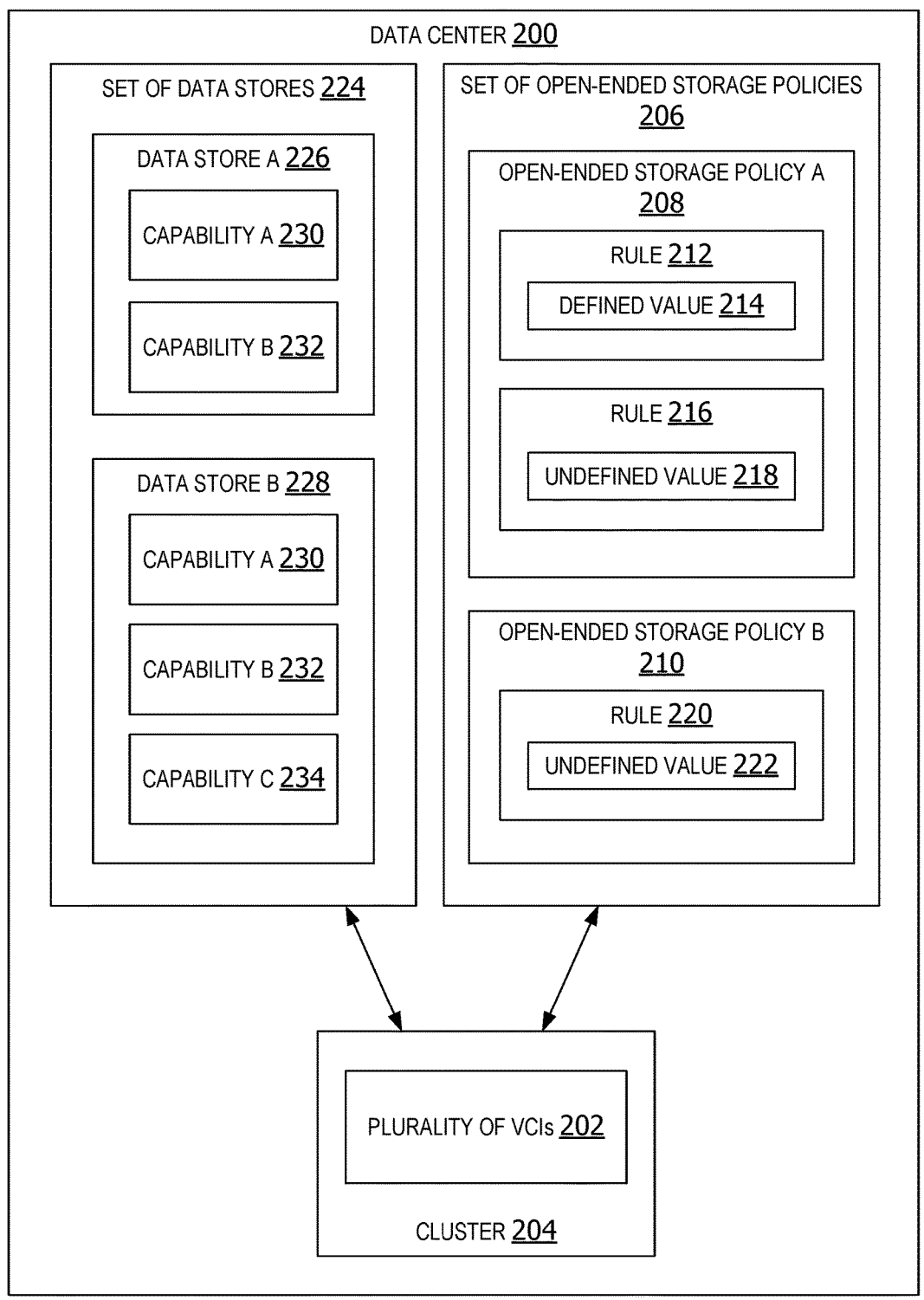
FIG. 2 is an exemplary block diagram illustrating open-ended storage policies for a set of data stores.

FIG. 2 is an exemplary block diagram illustrating open-ended storage policies for a set of data stores. A data center 200 is a system including one or more hosts running a plurality of VCIs 202. In some examples, the plurality of VCIs 202 run on two or more hosts in a cluster 204. A host in the cluster may be implemented as a host running on a server or a host running in a cloud environment, such as a hypervisor.

The data center 200 in this examples includes a set of one or more open-ended storage policies 206. The set of open-ended storage policies 206, in this non-limiting example, includes open-ended storage policy "A" 208 and open-ended storage policy "B" 210.

An open-ended storage policy consists of rules describing requirements for storage resources. Each rule refers to a specific data store capability and defines a value configuring this capability. An open-ended value includes an unspecified or open value to be selected by the user at VCI creation.

In this example, open-ended storage policy "A" 208 is an open-ended storage policy including a closed-ended rule 212 and an open-ended rule 216. The closed-ended rule 212 has a defined value 214. The open-ended rule 216 has an undefined value 218. The undefined value 218 is an open or unspecified value. The open-ended storage policy "B" 210 in this example further includes an open-ended rule 220 having another undefined value 222.

Users choose which data store capabilities to include in the open-ended storage policy at policy creation. Each data store supports one or more capabilities. A capability is a function associated with the stored data. Capabilities may include, without limitation, data backup capabilities, file management capabilities, user notifications, and so forth.

In some examples, the policy-based management engine obtains the set of available capabilities from a set of one or more data stores 224. The set of data stores in this non-limiting example includes data stores "A" 226 and data stores "B" 228.

Each data store supports one or more capabilities. Different data stores may support different capabilities. In other words, capabilities available on one data store may be absent on another data store. For example, data store "A" 226 may include a capability 230 and 232. Data store "B" 228 may include capability 230, 232, and 234.

Each data store capability is associated with one or more valid values for the given capability. For example, the capabilities of data store "B" 228 may include a "backup period" capability 230 with valid values "12 h", "24 h", or "48 h", indicating the data store can back up data every twelve hours, every twenty-four hours, or every forty-eight hours. For example, if the selected storage policy includes the capability "backup period" with a value "24 h", then the policy is compatible with the data store and includes a valid value for the backup period capability. A storage policy is compatible with the data store if it includes a valid value for each capability of the data store and excludes capabilities which are not supported on the data store.

The data store "B" 228 may also include a "VM backup folder." A valid value for this capability may include a list of folders on the data store "B" 228. Another capability 234 may include a "backup report email" having a valid email string value. If these services are applied to a VM, the data store makes automatic backups of the VM files every <backup period> specified in the storage policy, sends the backup files in the <VM backup folder>, and sends email reports to the <backup report email> address.

In this example, the list of valid VCI backup folders is unique for each data store in the set of data stores 224. Instead of creating at least one closed-ended storage policy for each data store which specifies the list of valid VM backup folders for each data store, an open-ended storage policy may be created.

In one example, a "24 H backup open-ended VM storage policy" is created having the following rules:
[{"Backup period": "24 h"}
{VM backup folder": <OPEN>},
{"Backup report email": <OPEN>}]
The backup period rule is a closed-ended rule having a specified "24 h" value. The "VM backup folder" rule is an open-ended rule having an unspecified value. The "backup report email" rule is also an open-ended rule. The open-ended rules remain undefined during policy creation.

If a first data store supports the following capabilities and supported values:
"Backup period": "24 h", "48 h",
"VM backup folder": "/backups/high-priority", "/backups/low-priority",
"Backup report email": <any valid email string>
The "24 H backup open-ended VM storage policy in the above example is compatible with this first data store because it supports the "24 h" backup period. However, a second data store having the following capabilities and supported values:

"Backup period": "12 h", "48 h",
"VM backup folder": "/vm-backups/backup12 h", "/vm-backups/backup48 h",
"Backup report email": <any valid email string>,
is incompatible with the "24 H backup open-ended VM storage policy" because the backup period capability is supported but the "24 h" backup period value is not a valid value for the second data store because the second data store does not support twenty-four hour backups.

In the above example, if a VM is created on the first data store, which is compatible with the "24 H backup open-ended VM storage policy", the user specifies a valid value to replace the missing values for the "VM backup folder" open-ended rule and the "backup report email" open-ended rule at VM creation. For the "VM backup folder" rule, the user chooses between the "/backups/high-priority" and "/backups/low-priority" values. For the "backup report email" open-ended rule, the user enters any valid email address. The user may have backup reports for each VM sent to a different user and/or different email address.

In some examples, the open-ended rules are presented to a user via a policy template. The policy template provides a list of valid values for each open-ended rule. In other examples, a list of valid values for each open-ended rule is output to the user via one or more pages in a VCI provisioning wizard.

The user selects a value for each open-ended rule to create a set of user selected values. In some non-limiting examples, the user selects an open-ended storage policy. The user also selects a data store compatible with the selected open-ended storage policy. The user chooses or provides one or more values for the open-ended rule(s) via an interface, such as a graphical user interface (GUI). The policy-based management engine applies the selected policy and the set of user selected values to the data store to create a VCI on the selected data store.

In some examples, the set of valid values for each open-ended rule is obtained from the data stores in the set of data stores 224. The policy-based management engine presents a list of available capabilities to the user during storage policy creation. The policy-based management engine outputs the capabilities and/or a list of valid values for each capability via any type of output device, such as, but not limited to, a display screen, a holographic display, an audio output, or any other type of output. The user selects a capability and then specifies a value to create a closed-ended rule. Alternatively, the user selects a capability and leaves the value unspecified to create an open-ended rule for a compatible open-ended storage policy.

An open-ended storage policy is compatible with a given data store when all the rules included within the policy refer to capabilities that are supported by the data store and the values for the rules are valid values for the data store. Different data stores are compatible with the open-ended storage policy depending on which capabilities are referred to in the open-ended storage policy and the values defined for the rules corresponding to the selected capabilities.

In other examples, an open-ended storage policy is compatible with a given data store when all closed-ended rules and all open-ended rules of the policy are based on capabilities supported by the given data store, the values of the closed-ended rules are valid data store values, and the set of values for an open-ended rule are valid data store values.

In one non-limiting example, data store "A" 226 in the set of data stores 224 may include the following capabilities:
C1 with valid values [C1_Val1, C1_Val2]; and
C2 with valid values [C2_Val1, C2_Val2].

The second data store "B" 228 may include the following capabilities:
C1 with valid values [C1_Val1, C1_Val2];
C2 with valid values [C2_Val1, C2_Val3];
C3 with valid values [C3_Val1, C3_Val2].
In this example, the set of available capabilities the user can refer to in an open-ended storage policy is the logical sum of those two sets, which is as follows:
C1 with valid values [C1_Val1, C1_Val2];
C2 with valid values [C2_Val1, C2_Val2, C2_Val3];
C3 with valid values [C3_Val1, C3_Val2].

For example, if open-ended storage policy "A" 208 includes rules {C1:C1_Val1} and {C2:C2_Val1}, then open-ended storage policy "A" 208 will be compatible with both data store "A" 226 and data store "B" 228. Likewise, if open-ended storage policy "B" 210 includes rules {C1:C1_Val1} and {C2:C2 Val3}, then open-ended storage policy "B" 210 is only compatible with data store "B" 228 because data store "A" 226 does not support the value "C2_Val3".

In yet another example, if a given policy "C" includes a rule {C2:C2_Val2} and a second rule having a value {C3:C3_Val1}, then policy "C" is incompatible with both the first data store "A" 226 or the second data store "B" 228 because neither of these data stores support the capabilities and values recited in policy "C." More specifically, data store "A" 226 does not support capability "C3" of policy "C." Although data store "B" 228 supports capability "C2" and "C3," the value "C2_Val2" is not a valid value for capability "C2" on data store "B" 228.

An interface associated with cluster 204 outputs a list of open-ended storage policies 206 at VCI creation. The user selects an open-ended storage policy from the set of open-ended storage policies 206 via the interface. In some non-limiting examples, the interface is a GUI. In other examples, the interface is a menu driven interface, command line interface, voice recognition system, or other interface.

Upon selection of the open-ended storage policy "A" 208, the interface outputs a list of compatible data stores from the set of data stores 224. In some examples, the set of data stores 224 are the data stores available in a virtual computing (VC) inventory. The list may be output via a display screen, a projector, a holographic display, an audio output, a graphic on a GUI, or other output. The user chooses a data store compatible with the selected open-ended storage policy from the output list.

A list of valid values is output for each open-ended rule in the selected open-ended storage policy. The user selects a value from the list of valid values for each of the open-ended rules within the selected policy. The user selected value is assigned to the corresponding open-ended rule. When every open-ended rule in the selected policy is assigned a user-selected value, the open-ended policy is complete. In other words, a complete storage policy is an open-ended policy having a user-selected compatible value assigned to each open-ended rule in the open-ended policy. The complete storage policy is compatible with a user selected data store. The complete storage policy is utilized to provision a first VCI on the selected data store based on the selected open-ended storage policy and the set of user selected values for the set of open-ended rules in the policy. In this manner, the open-ended policies' rule values are specified after user selection of a VM and/or data storage, such that the policy rules definitions/values depend on the particular VCI properties and/or data store capabilities.

The user may select a different value for each open-ended rule in the selected policy to create a different, second VCI. In other words, a user may utilize the same open-ended policy with different sets of user selected values to generate different VCIs on one or more compatible data stores.

In some examples, the policy-based management engine includes a VCI provisioning wizard. The VCI provisioning wizard includes a first UI for creating an open-ended storage policy. The VCI provisioning wizard provides a second UI for selecting an open-ended storage policy having a set of open-ended rules. The second UI outputs a list of compatible data stores for user selection of a data store. The second UI outputs sets of valid values for each open-ended rule. The user selects a valid value for each open-ended rule in the set of the open-ended rules from the sets of valid values.

The UI receives the user selected data store and user selected valid values for the open-ended storage policy. The policy-based management engine applies the open-ended storage policy and user selected values to provision the VCI. The policy-based management engine provisions the VCI on the selected data store using the selected policy and a set of user selected values for the set of open-ended rules. A VCI provisioned on the selected data store utilizes capabilities and/or functions of the data store in accordance with the rules and rule values specified in the open-ended storage policy.

In other examples, the VCI provisioning wizard outputs a first page including a list of data stores compatible with a selected open-ended storage policy. If the user selects a data store from the list, the VCI provisioning wizard outputs a second page listing all open-ended rules associated with the selected open-ended storage policy. For each open-ended rule, the VCI provisioning wizard presents a list of valid values for the selected data store to the user. After the user provides the missing values for the open-ended rules, the VCI is created on the selected data store using the requirements described in the open-ended storage policy plus the values of the open-ended rules entered in the wizard.

In still other examples, the policy-based management engine provides a single UI for creating the open-ended storage policy, selecting a data store compatible with the selected open-ended storage policy, and choosing one or more values for the one or more open-ended rules in the selected open-ended storage policy.

Figure 3:
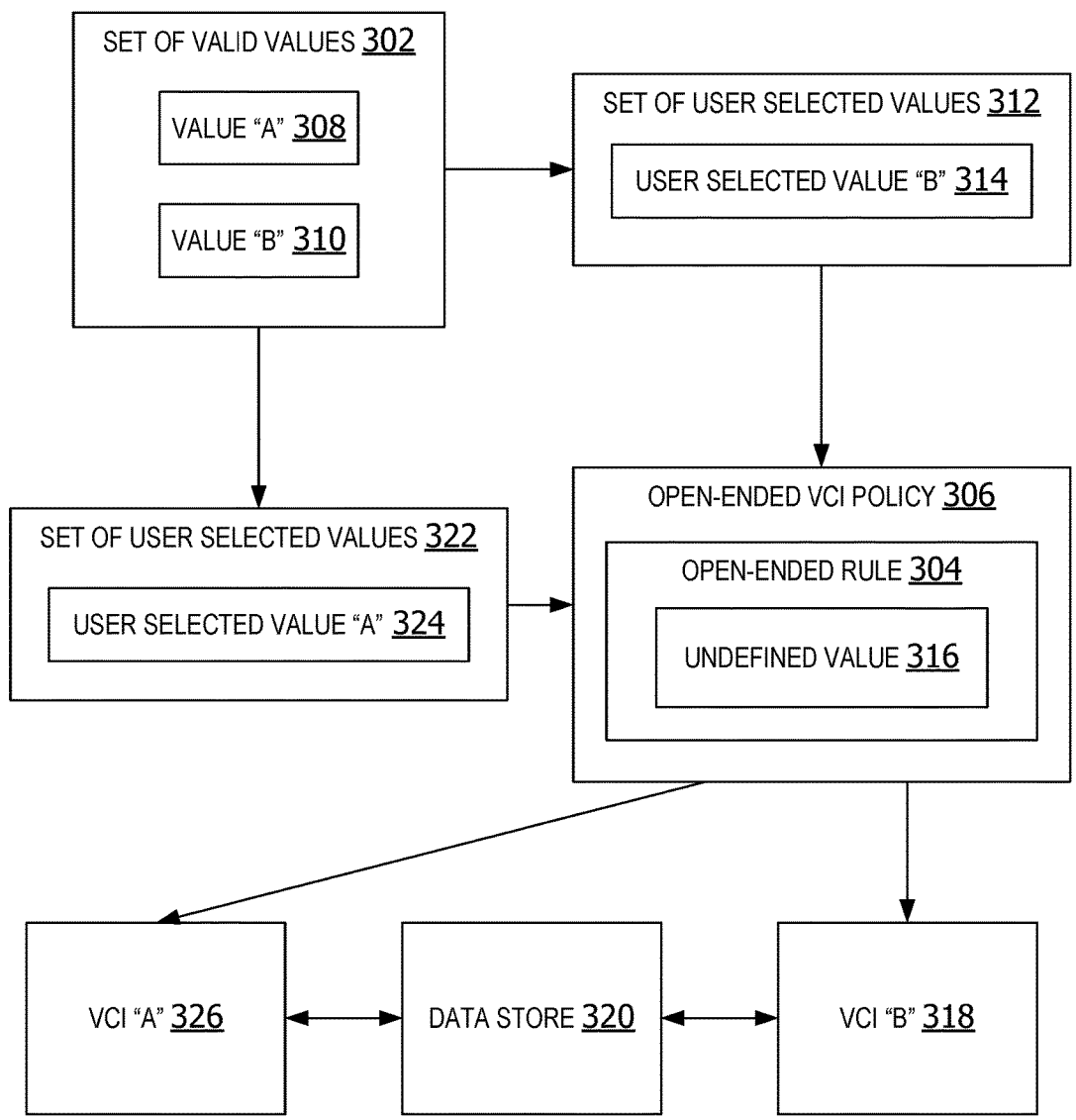
FIG. 3 is an exemplary block diagram illustrating application of user selected values to an open-ended virtual computing instance (VCI) policy for provisioning one or more VCIs.

FIG. 3 is an exemplary block diagram illustrating application of user selected values to an open-ended VCI policy for provisioning one or more VCIs. A policy-based management engine outputs a set of valid values 302 for a given open-ended rule 304. The open-ended rule is associated with an open-ended VCI policy 306 selected by a user. The set of valid values 302 includes one or more values. In this example, the set of valid values 302 includes a value "A" 308 and a value "B" 310.

A user selects a valid value from a set of valid values for each open-ended rule. In this example, there is only one open-ended rule. In other examples, two or more sets of valid values are output to a user corresponding to two or more open-ended rules.

The policy-based management engine receives the set of user selected values 312 from the user. In this example, the set of user selected values 312 includes a user selected value "B" 314 corresponding to the open-ended rule 304. The user selected value "B" 314 is applied to the open-ended VCI policy to provide a value for the undefined value.

The received set of user selected values 312 is applied to the open-ended VCI policy 306 to provision a VCI "B" 318. In other words, the received set of user selected values 312 is applied to the selected open-ended VCI policy 306 for use by a selected VCI "B" 318 with a selected data store 320.

A user may utilize the same open-ended VCI policy 306 to provision one or more other VCIs on the same data store or on a different data store. For example, a set of user selected values 322 may include a different user selected value "A" 324 for the open-ended rule 304. The set of user selected values 322 and the open-ended VCI policy 306 in this example are applied to provision VCI "A" 326. In other words, the received set of user selected values 322 is applied to the selected open-ended VCI policy 306 for use by a selected VCI "A" 326 with the selected data store 320.

In other examples, the set of user selected values 322 may be applied to the selected open-ended VCI policy 306 for use by a different selected VCI with a different selected data store.

FIG. 4 is an exemplary flow chart illustrating creation of a VCI on a data store in accordance with an open-ended VCI policy. The process shown in FIG. 4 may be performed by a policy-based management component on a computing device, such as, but not limited to, the policy-based management engine 116 in FIG. 1. The computing device may be implemented as a device such as, but not limited to, the one or more server(s) 104 associated with the data center 102 in FIG. 1, data center 200 in FIG. 2, host computing device 900 in FIG. 9, or host computing device 1000 in FIG. 10. Further, execution of the operations illustrated in FIG. 4 is not limited to a policy-based management engine. One or more computer-readable storage media storing computer-readable instructions may execute to cause at least one processor to implement the operations illustrated in FIG. 4.

The process begins by receiving a selection of an open-ended storage policy and a compatible data store at 402. A determination is made as to whether an open-ended rule is present at 404. If yes, a list of valid values for the open-ended rule are output at 406. The user selected value for the rule is received at 408. A determination is made as to whether there is a next open-ended rule in the open-ended storage policy at 410. If yes, a list of valid values for the next rule is output to the user and user selected values are received iteratively at 406-410 until there are no additional open-ended rules at 410. The received set of user selected values are applied to the open-ended VCI policy at 412. The process terminates thereafter.

When a user selected value is received for each open-ended rule, the open-ended VCI policy is complete. The open-ended VCI policy and the set of user selected values may then be applied to a VCI to provision the VCI in accordance with the open-ended VCI policy and the user selected rules.

While the operations illustrated in FIG. 4 are described as performed by a host computing device or a server, aspects of the disclosure contemplate that performance of the operations by other entities. For example, a cloud service may perform one or more of the operations.

FIG. 5 is an exemplary flow chart illustrating creation of an open-ended storage policy. The process shown in FIG. 5 may be performed by a policy-based management component on a computing device, such as, but not limited to, the policy-based management engine 116 in FIG. 1. The computing device may be implemented as a device such as, but not limited to, the one or more server(s) 104 associated with the data center 102 in FIG. 1, data center 200 in FIG. 2, host computing device 900 in FIG. 9, or host computing device 1000 in FIG. 10. Further, execution of the operations illustrated in FIG. 5 is not limited to a policy-based management component. One or more computer-readable storage media storing computer-readable instructions may execute to cause at least one processor to implement the operations illustrated in FIG. 5.

The process begins by creating one or more policy rule(s) for a policy at 502. A determination is made as to whether the policy is open-ended at 504. If no, values are defined for all rule(s) in the policy at 506. If the policy is open-ended at 504, an undefined value is set for at least one open-ended rule at 508. Value(s) of any closed-ended rules are defined at 510. A determination is made as to whether the VCI policy is complete at 512. If yes, the policy is saved at 514. The process terminates thereafter.

While the operations illustrated in FIG. 5 are described as performed by a host computing device or a server, aspects of the disclosure contemplate that performance of the operations by other entities. For example, a cloud service may perform one or more of the operations.

The operations illustrated in FIG. 5 are described as creating an open-ended storage policy. However, in other examples, the operations of FIG. 5 may be utilized to create an open-ended compute policy, an open-ended network policy, or other type of policy.

Figure 8:
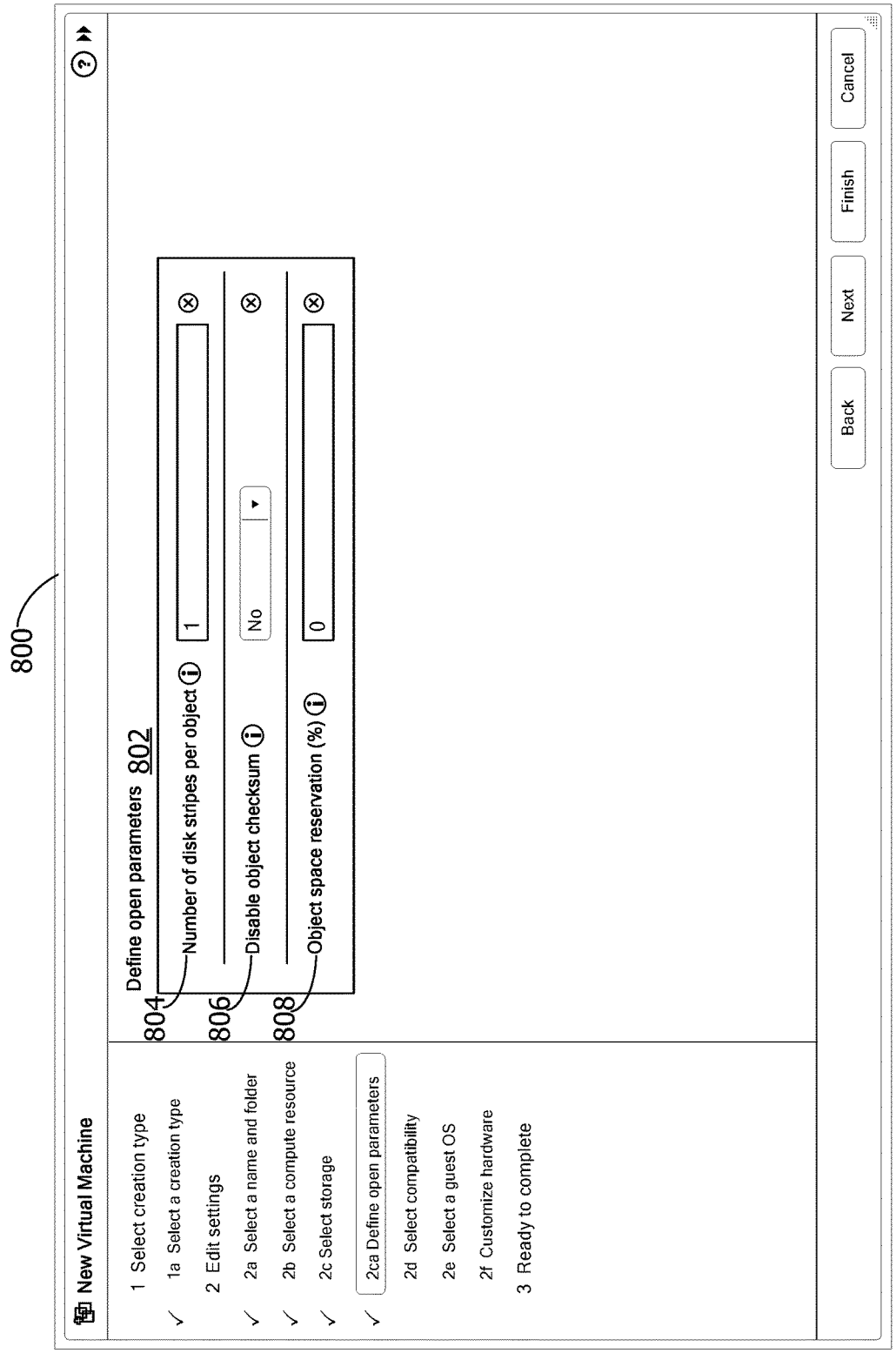
FIG. 8 is an exemplary screenshot illustrating a UI for defining values for open-ended VCI policy rules.

FIG. 6, FIG. 7, and FIG. 8 below illustrate exemplary screenshots for creating open-ended storage policies and using open-ended storage policies to provision and/or manage VCI creation on a host capable of interfacing with a compatible data store. The screenshots are non-limiting examples of GUI pages which may be created and/or output to a user by a VCI provisioning wizard. However, the examples are not limited to the UIs shown in the figures.

FIG. 6 is an exemplary screenshot illustrating a user interface (UI) for creating an open-ended storage policy. The screenshot 600 is an exemplary GUI for creating an open-ended rule for a storage policy. In this non-limiting example, the screenshot 600 is a page generated in a wizard.

In this example, the rule set 602 for an open-ended storage policy. The rule set 602 includes a closed-ended "flash read cache reservation" rule 604, a closed-ended "force provisioning" rule 606, and an open-ended "number of failures to tolerate" rule 608. The closed-ended rules include a specified value. The open-ended rule 608 includes an unspecified value.

In this example, a user selects a control 610 to make a rule open-ended. The user may select another control 612 to add another rule to the rule set 602 for the open-ended storage policy being created.

FIG. 7 is an exemplary screenshot illustrating a UI for selecting a data store compatible with a selected open-ended storage policy. Screenshot 700 is an example of a GUI for a user to select a storage 702 for a new VM 704 that is compatible with a selected open-ended storage policy 706. In this non-limiting example, the GUI presents a list of data stores that are compatible with the selected open-ended storage policy 706. The list of data stores in this example includes a data store 708, data store 710, and data store 712.

The user utilizes the GUI to select a data store from the list. The new VM 704 is created on a host associated with the selected data store. The VM 704 is created using the selected open-ended storage policy 706 and a set of user selected values for the open-ended rule(s).

FIG. 8 is exemplary screenshot illustrating a UI for defining values for open-ended storage policy rules. Screenshot 800 includes a GUI for defining open parameters 802 of an open-ended storage policy. The list of open-ended rules in this example includes an undefined "number of disk stripes" value 804, an undefined "disable object checksum" value 806, and an undefined "object space reservation"

value 808. A user utilizes one or more controls associated with the GUI to select a valid value for each of the undefined values 804, 806, and 808 for the open-ended storage policy.

In the examples shown in FIG. 6, FIG. 7, and FIG. 8, a user selects an open-ended storage policy, data storage, values, and so forth via graphical controls associated with a GUI. However, in other examples, a command line interface, menu driven interface, or some other interface may be utilized to create the open-ended storage policy, select a data store, and select values for the open-ended rules.

Figure 9:
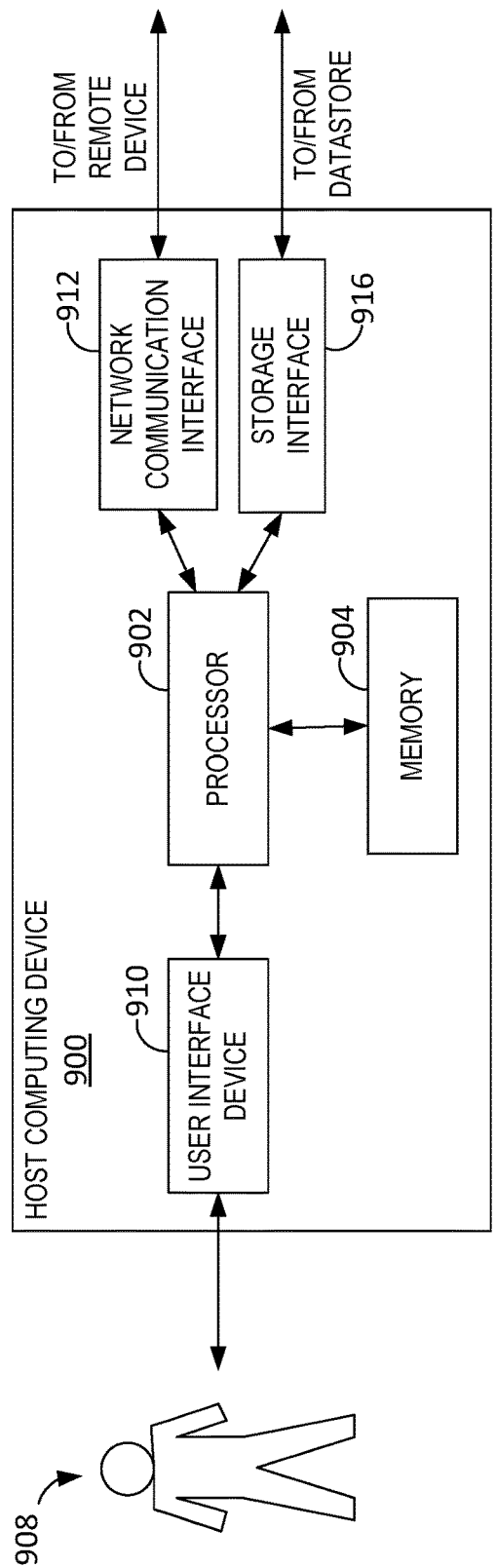
FIG. 9 is a block diagram of an example host computing device.

FIG. 9 is a block diagram of an example host computing device. The host computing device 900 is a computing device capable of supporting one or more VCIs. In some non-limiting examples, the host computing device 900 is implemented as a host or ESXi host from VMware, Inc.

A host computing device 900 includes a processor 902 for executing instructions. In some examples, executable instructions are stored in a memory 904. Memory 904 is any device allowing information, such as, but not limited to, executable instructions, to be stored and retrieved. For example, memory 904 may include one or more random access memory (RAM) modules, flash memory modules, hard disks, solid state disks, and/or optical disks.

Host computing device 900 may include a user interface device 910 for receiving data from a user 908 and/or for presenting data to user 908. User 908 may interact indirectly with host computing device 900 via another computing device such as VMware's vCenter Server or another management device.

User interface device 910 may include, for example, a keyboard, a pointing device, a mouse, a stylus, a touch sensitive panel (e.g., a touch pad or a touch screen), a gyroscope, an accelerometer, a position detector, and/or an audio input device.

The user interface device 910 in some examples includes a graphics card for displaying data to the user and receiving data from the user. The user interface device 910 may also include computer-executable instructions (e.g., a driver) for operating the graphics card. Further, the user interface device 910 may include a display (e.g., a touch screen display or natural user interface) and/or computer-executable instructions (e.g., a driver) for operating the display. The user interface device 910 may optionally include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor.

In some examples, the user interface device 910 operates to receive data from the user 908, while another device (e.g., a presentation device) operates to present data to user 908. In other examples, the user interface device 910 has a single component, such as a touch screen, that functions to both output data to user 908 and receive data from the user 908. In such examples, the user interface device 910 operates as a presentation device for presenting information to user 908. In such examples, the user interface device 910 represents any component capable of conveying information to user 908. For example, the user interface device 910 may include, without limitation, a display device (e.g., a liquid crystal display (LCD), organic light emitting diode (OLED) display, or "electronic ink" display) and/or an audio output device (e.g., a speaker or headphones). In some examples, the user interface device 910 includes an output adapter, such as a video adapter and/or an audio adapter. An output adapter is operatively coupled to the processor 902 and configured to be operatively coupled to an output device, such as a display device or an audio output device.

The host computing device 900 also includes a network communication interface 912, which enables the host computing device 900 to communicate with a remote device (e.g., another computing device) via a communication medium, such as a wired or wireless packet network. The network communications interface 912 in some examples may include a network interface card and/or computer-executable instructions (e.g., a driver) for operating the network interface card. Communication between the host computing device 900 and other devices may occur using any protocol or mechanism over any wired or wireless connection. In some examples, the communications interface is operable with short range communication technologies such as by using near-field communication (NFC) tags.

The host computing device 900 transmits and/or receives data via the network communication interface 912 in some examples. The user interface device 910 and/or network communication interface 912 may be referred to collectively as an input interface and may be configured to receive information from the user 908.

The host computing device 900 further includes a storage interface 916 that enables the host computing device 900 to communicate with one or more data stores, which store virtual disk images, and/or software applications suitable for use with the computer-implemented methods described herein. In example examples, the storage interface 916 couples the host computing device 900 to a storage area network (SAN) (e.g., a Fibre Channel network) and/or to a network-attached storage (NAS) system (e.g., via a packet network). The storage interface 916 may be integrated with network communication interface 912.

Figure 10:
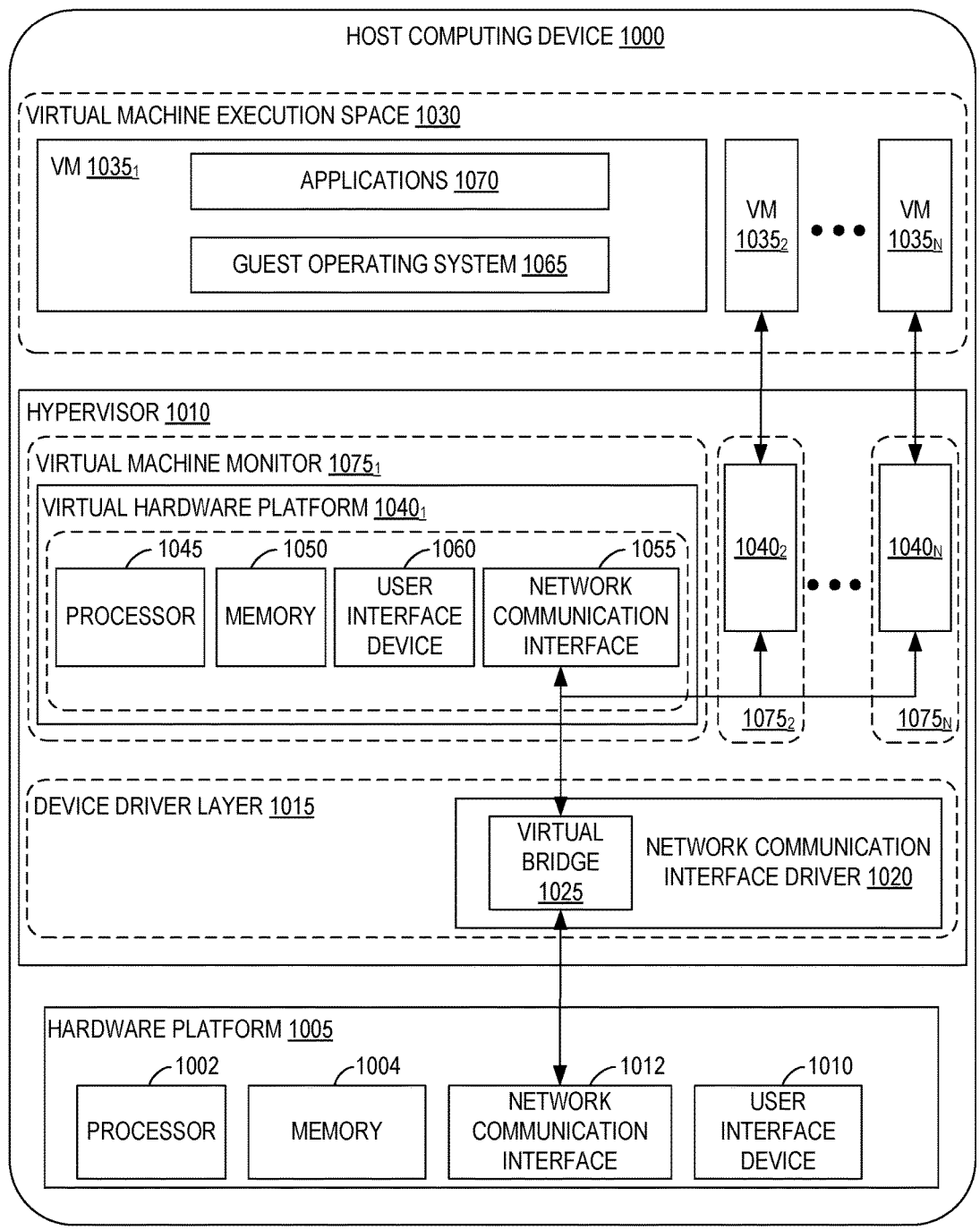
FIG. 10 is a block diagram of VMs instantiated on a host computing device.

FIG. 10 depicts a block diagram of VMs $1035_1$, $1035_2$ . . . $1035_N$ that are instantiated on host computing device 1000. The host computing device 1000 represents any device executing instructions (e.g., as application(s), operating system, operating system functionality, or both) to implement the operations and functionality associated with the host computing device 1000. The host computing device 1000 may be implemented as a server, a desktop personal computers, kiosks, tabletop devices, industrial control devices, or other host computing device for supporting one or more VCIS, such as, but not limited to, a server in the data center 102 in FIG. 1.

The host computing device 1000 includes a hardware platform 1005, such as an x86 architecture platform. The hardware platform 1005 may include a processor 1002, memory 1004, network communication interface 1012, user interface device 1010, and other input/output (I/O) devices, such as a presentation device. The processor 1002 may include one or more processors. A virtualization software layer is installed on top of the hardware platform 1005. The virtualization software layer supports a VM execution space 1030 within which multiple VMs (VMs $1035_1$-$1035_N$) may be concurrently instantiated and executed.

The host computing device 1000 further includes one or more computer executable components. Exemplary components include a hypervisor 1010. The hypervisor 1010 is a VM monitor that creates and/or runs one or more VMs. In one example, the hypervisor 1010 is implemented as a vSphere Hypervisor from VMware, Inc.

Hypervisor 1010 in some examples includes a device driver layer 1015, and maps physical resources of the hardware platform 1005 (e.g., processor 1002, memory 1004, network communication interface 1012, and/or user interface device 1010) to "virtual" resources of each of the VMs $1035_1$-$1035_N$ such that each of the VMs $1035_1$-$1035_N$ has its own virtual hardware platform (e.g., a corresponding one of virtual hardware platforms $1040_1$-$1040_N$), each virtual hardware platform having its own emulated hardware (such as a processor 1045, a memory 1050, a network communication interface 1055, a user interface device 1060 and other emulated I/O devices in VM $1035_1$).

Hypervisor 1010 may manage (e.g., monitor, initiate, and/or terminate) execution of VMs $1035_1$-$1035_N$ according to policies associated with hypervisor 1010, such as an open-ended storage policy specifying that VMs $1035_1$-$1035_N$ are to be automatically respawned upon unexpected termination and/or upon initialization of hypervisor 1010. In addition, or alternatively, the hypervisor 1010 may manage execution VMs $1035_1$-$1035_N$ based on requests received from a device other than host computing device 1000. For example, the hypervisor 1010 may receive an execution instruction specifying the initiation of execution of first VM $1035_1$ from a management device via the network communication interface 1012 and execute the execution instruction to initiate execution of first VM $1035_1$.

In some examples, the memory 1050 in the first virtual hardware platform $1040_1$ includes a virtual disk that is associated with or "mapped to" one or more virtual disk images stored on a disk (e.g., a hard disk or solid state disk) of the host computing device 1000. The virtual disk image represents a file system (e.g., a hierarchy of directories and files) used by the first VM $1035_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

The device driver layer 1015 includes, for example, a communication interface driver 1020 that interacts with the network communication interface 1012 to receive and transmit data from, for example, a LAN connected to the host computing device 1000. The communication interface driver 1020 also includes a virtual bridge 1025 that simulates the broadcasting of data packets in a physical network received from one communication interface (e.g., network communication interface 1012) to other communication interfaces (e.g., the virtual communication interfaces of VMs $1035_1$-$1035_N$). Each virtual communication interface for each VM $1035_1$-$1035_N$, such as the network communication interface 1055 for the first VM $1035_1$, may be assigned a unique virtual MAC address that enables virtual bridge 1025 to simulate the forwarding of incoming data packets from the network communication interface 1012. In an example, the network communication interface 1012 is an Ethernet adapter that is configured in "promiscuous mode" such that all Ethernet packets that it receives (rather than just Ethernet packets addressed to its own physical MAC address) are passed to virtual bridge 1025, which, in turn, is able to further forward the Ethernet packets to VMs $1035_1$-$1035_N$. This configuration enables an Ethernet packet that has a virtual MAC address as its destination address to properly reach the VM in the host computing device 1000 with a virtual communication interface that corresponds to such virtual MAC address.

The virtual hardware platform $1040_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 1065 to execute applications 1070 for an instantiated VM, such as the first VM $1035_1$.

The applications 1070, when executed by the processor, operate to perform functionality on the host computing device 1000. The application(s) may communicate with counterpart applications or services such as web services accessible via a network. For example, the applications may represent downloaded client-side applications that correspond to server-side services executing in a cloud.

The virtual hardware platforms $1040_1$-$1040_N$ may be considered to be part of the VM monitors (VMM) $1075_1$-$1075_N$ that implement virtual system support to coordinate operations between the hypervisor 1010 and corresponding VMs $1035_1$-$1035_N$. Those with ordinary skill in the art will recognize that the various terms, layers, and categorizations used to describe the virtualization components in FIG. 10 may be referred to differently without departing from their functionality or the spirit or scope of the disclosure. For example, the virtual hardware platforms $1040_1$-$1040_N$ may also be considered to be separate from VMs $1075_1$-$1075_N$, and VMs $1075_1$-$1075_N$ may be considered to be separate from hypervisor 1010. One example of the hypervisor 1010 that may be used in an example of the disclosure is included as a component in VMware's ESX brand software, which is commercially available from VMware, Inc.

The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, personal computer, mobile device, or the like, this is only an exemplary implementation and not a limitation. As those skilled in the art will appreciate, the present embodiments are suitable for application in a variety of different types of computing devices, for example, PCs, servers, laptop computers, tablet computers, etc.

The terms 'computer', 'computing apparatus', 'mobile device', 'computing device' and the like are used herein to refer to any device with processing capability such that it can execute instructions. Those skilled in the art will realize that such processing capabilities are incorporated into many different devices and therefore the terms 'computer', 'computing device', and 'computing apparatus' each may include PCs, servers, laptop computers, mobile telephones (including smart phones), tablet computers, and many other devices.

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

In some examples, the computing system environment includes a data center. A data center may include one or more computer systems at one or more different locations. For example, the data center may include a first computer system at a first site and/or a second computer system at a second site. The first computer system at the first site in some non-limiting examples executes program code, such as computer readable instructions stored on non-transitory computer readable storage medium.

Examples of the disclosure may be described in the general context of computer-executable instructions stored on memory, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform tasks or implement abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

The examples illustrated and described herein as well as examples not specifically described herein but within the scope of aspects of the disclosure constitute exemplary means for performing deep packet inspection at a vNIC level. For example, the elements illustrated in FIG. 1, FIG. 2, FIG. 3, FIG. 9, and FIG. 10, such as when encoded to perform the operations illustrated in FIG. 4 and FIG. 5 constitute exemplary means for receiving a selection of an open-ended VCI policy comprising a set of open-ended rules, each open-ended rule in the set of open-ended rules having an undefined value; outputting a set of valid values for each open-ended rule in the set of open-ended rules to a user; receiving a set of user selected values from the user, the set of user selected values comprising a value selected by the user from the set of valid values for each open-ended rule in the set of open-ended rules; and creating a VCI that interfaces with a selected data store based on the selected open-ended VCI policy and the set of user selected values corresponding to the set of open-ended rules.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method for open-ended policy-based management, the method comprising:
    receiving a selection of an open-ended virtual computing instance (VCI) policy, the open-ended VCI policy being an open-ended storage policy;
    identifying a set of data stores compatible with the selected open-ended VCI policy;
    outputting the compatible set of data stores via a user interface (UI);
    receiving, from a user, a selection of a data store from the set of data stores via the UI, the open-ended VCI policy further comprising a set of open-ended rules, each open-ended rule in the set of open-ended rules having an undefined value;
    outputting a set of valid values for each open-ended rule in the set of open-ended rules to the user, the set of valid values corresponding to a selected resource, a selected VCI, or both; and
    receiving a set of user selected values from the user, the set of user selected values comprising a value selected by the user from the set of valid values for each open-ended rule in the set of open-ended rules; and
    applying the received set of user selected values to the selected open-ended VCI policy for use by the selected VCI with the selected resource.

2. The method of claim 1, further comprising:
    outputting a first graphical user interface (GUI) for open-ended VCI policy creation; and
    outputting a second GUI for VCI provisioning based on at least one open-ended storage policy, wherein the user selects the open-ended storage policy, a data store compatible with the selected open-ended storage policy, and the set of user selected values for the set of open-ended rules within the selected open-ended storage policy via the GUI.

3. The method of claim 1, further comprising:
    provisioning a VCI on a host based on the set of user selected values.

4. The method of claim 1, further comprising:
    creating an open-ended VCI policy, wherein creating the open-ended VCI policy comprises creating a set of rules corresponding to one or more resource capabilities, wherein at least one rule in the set of rules is an open-ended rule having the undefined value.

5. The method of claim 1, further comprising:
    outputting the set of valid values for a given open-ended rule to the user via a GUI;
    receiving a user selected value from the set of valid values via the GUI and
    assigning the user selected value to the given open-ended rule.

6. The method of claim 1, further comprising:
    generating a first page in a GUI comprising a set of data stores compatible with the selected open-ended storage policy via a VCI provisioning wizard, wherein a user selected data store is received via the GUI; and outputting the set of valid values for a given open-ended rule on a second page of the GUI via the VCI provisioning wizard, wherein the user selects a value from the set of valid values via the GUI.

7. The method of claim 1, the method further comprising:
providing a graphical user interface (GUI), wherein the GUI outputs the set of valid values;
receiving the set of user selected values from the set of valid values via the GUI; and
assigning the user selected value to each open-ended rule.

8. A system for open-ended policy-based management, said system comprising:
at least one memory associated with at least one server, the at least one memory storing a policy-based management engine;
a set of data stores; and
at least one physical processor programmed to execute the policy-based management engine to:
receive a selection of an open-ended virtual computing instance (VCI) policy, wherein the open-ended VCI policy is an open-ended storage policy, and wherein the set of data stores includes a set of data stores compatible with the selected open-ended VCI policy, and wherein a user interface (UI) outputs the compatible set of data stores for selection of a given data store from the set of data stores via the UI, the open-ended VCI policy further comprising a set of open-ended rules, each open-ended rule in the set of open-ended rules having an undefined value;
output a set of valid values for each open-ended rule in the set of open-ended rules to a user, the set of valid values corresponding to a selected resource, a selected VCI, or both; and
receive a set of user selected values from the user, the set of user selected values comprising a value selected by the user from the set of valid values for each open-ended rule in the set of open-ended rules; and
apply the received set of user selected values to the selected open-ended VCI policy for use by the selected VCI with the selected resource.

9. The system of claim 8 further comprising:
a first graphical user interface (GUI) for open-ended storage policy creation; and
a second GUI for VCI provisioning, wherein the user selects the open-ended storage policy, a data store compatible with the selected open-ended storage policy, and a set of valid values for the set of open-ended rules within the selected open-ended storage policy via the GUI.

10. The system of claim 8
wherein the UI outputs a list of data stores compatible with the selected open-ended storage policy and receives a selection of a data store from the list of compatible data stores, wherein the policy-based management engine provisions a VCI on a host based on the selected data store, and the set of user selected values corresponding to the set of open-ended rules.

11. The system of claim 10, wherein the policy-based management engine is further executed to create an open-ended VCI policy, wherein creating the open-ended VCI policy comprises creating a set of rules corresponding to one or more resource capabilities, wherein at least one rule in the set of rules is an open-ended rule having the undefined value.

12. The system of claim 8, further comprising:
a GUI, wherein the GUI outputs the set of valid values for a given open-ended rule; receives a user selected value from the set of valid values via the GUI; and assigns the user selected value to the given open-ended rule.

13. The system of claim 8, further comprising:
a VCI provisioning wizard, wherein the VCI provisioning wizard is executed by the at least one physical processor to generate a first page in a GUI comprising a set of data stores compatible with the selected open-ended storage policy via a VCI provisioning wizard, wherein a user selected data store is received via the GUI; and output the set of valid values for a given open-ended rule on a second page of the GUI via the VCI provisioning wizard, wherein the user selects a value from the set of valid values via the GUI.

14. The system of claim 8, wherein a VCI comprises one of a virtual machine or a software container.

15. One or more non-transitory computer storage media embodying computer-executable components, said components comprising a policy-based management engine executed to cause at least one physical processor to:
receive a selection of an open-ended virtual computing instance (VCI) policy comprising a set of open-ended rules, each open-ended rule in the set of open-ended rules having an undefined value;
provide a user interface (UI), wherein the UI outputs a set of data stores compatible with the selected open-ended VCI policy and receives a selection of a data store from the set of data stores via the UI;
output a set of valid values for each open-ended rule in the set of open-ended rules to a user, the set of valid values corresponding to a selected resource, a selected VCI, or both; and
receive a set of user selected values from the user, the set of user selected values comprising a value selected by the user from the set of valid values for each open-ended rule in the set of open-ended rules; and
apply the received set of user selected values to the selected open-ended VCI policy for use by the selected VCI with the selected resource.

16. The non-transitory computer storage media of claim 15, wherein the open-ended VCI policy is an open-ended storage policy and further comprising:
a graphical user interface (GUI) that is executed to cause the at least one physical processor to output a GUI for open-ended storage policy creation; and output a second GUI for VCI provisioning based on at least one open-ended storage policy, wherein the user selects the open-ended storage policy from a plurality of open-ended storage policies, a data store compatible with the selected open-ended storage policy, and a set of valid values for a set of open-ended rules within the selected open-ended storage policy via the GUI.

17. The non-transitory computer storage media of claim 15, wherein the open-ended VCI policy is an open-ended storage policy and wherein the UI is executed to cause the at least one physical processor to output a list of data stores compatible with the selected open-ended storage policy and receive a selection of a data store from the list of compatible data stores, wherein the policy-based management engine provisions a VCI on a host based on the selected data store, and the set of user selected values corresponding to the set of open-ended rules.

18. The non-transitory computer storage media of claim 15, wherein the policy-based management engine is further executed to cause at least one physical processor to create an open-ended VCI policy, wherein creating the open-ended VCI policy comprises creating a set of rules corresponding to one or more resource capabilities, wherein at least one rule in the set of rules is an open-ended rule having the undefined value.

19. The non-transitory computer storage media of claim 15, further comprising:
- a GUI that is executed by the at least one physical processor to output the set of valid values for a given open-ended rule; receive a user selected value from the set of valid values via the GUI; and assign the user selected value to the given open-ended rule.

20. The non-transitory computer storage media of claim 15, further comprising:
- a first graphical user interface (GUI) for open-ended storage policy creation; and
- a second GUI for VCI provisioning, wherein the user selects the open-ended storage policy, a data store compatible with the selected open-ended storage policy, and a set of valid values for the set of open-ended rules within the selected open-ended storage policy via the GUI.

\* \* \* \* \*